(12) United States Patent
Schmitt et al.

(10) Patent No.: US 12,205,340 B2
(45) Date of Patent: Jan. 21, 2025

(54) NEURAL NETWORK FOR CLASSIFYING OBSTRUCTIONS IN AN OPTICAL SENSOR

(71) Applicant: Robert Bosch GmbH, Stuttgart (DE)

(72) Inventors: Marcus Schmitt, Ditzingen (DE); Magnus Ernst Daum, Offenbach (DE); Sebastian Johann Hermann Konopka, Stuttgart (DE); Thomas Hellmuth, Constance (DE); Ulrich Stopper, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 389 days.

(21) Appl. No.: 17/859,659

(22) Filed: Jul. 7, 2022

(65) Prior Publication Data

US 2023/0027627 A1 Jan. 26, 2023

(30) Foreign Application Priority Data

Jul. 26, 2021 (EP) .................................. 21187601

(51) Int. Cl.
*G06V 10/82* (2022.01)
*B25J 9/16* (2006.01)
*G06V 10/26* (2022.01)

(52) U.S. Cl.
CPC ............ *G06V 10/26* (2022.01); *B25J 9/1697* (2013.01); *G06V 10/82* (2022.01)

(58) Field of Classification Search
CPC ...................... G06V 10/00–993; B25J 9/1697
See application file for complete search history.

(56) References Cited

U.S. PATENT DOCUMENTS

| | | | |
|---|---|---|---|
| 2019/0025773 A1* | 1/2019 | Yang | G06F 18/214 |
| 2019/0303669 A1* | 10/2019 | Spooner | G06N 3/08 |
| 2019/0385025 A1* | 12/2019 | McMichael | G06V 10/82 |
| 2020/0241111 A1* | 7/2020 | Fetterman | G01S 7/412 |
| 2020/0341466 A1* | 10/2020 | Pham | G08G 1/166 |
| 2021/0295069 A1* | 9/2021 | Toth | G06V 20/59 |
| 2022/0176917 A1* | 6/2022 | Phinisee | H04N 7/185 |
| 2022/0245792 A1* | 8/2022 | Gao | G06T 7/0008 |
| 2023/0027627 A1* | 1/2023 | Schmitt | G06V 20/56 |
| 2023/0042450 A1* | 2/2023 | Yang | G06N 3/045 |
| 2023/0206608 A1* | 6/2023 | Eldar | G06V 20/588 |
| | | | 701/28 |

FOREIGN PATENT DOCUMENTS

WO 2020154046 A1 7/2020

* cited by examiner

*Primary Examiner* — Sean T Motsinger
(74) *Attorney, Agent, or Firm* — NORTON ROSE FULBRIGHT US LLP; Gerard A. Messina (57) ABSTRACT

A neural network configured for classifying whether an image from an optical sensor characterizes an obstruction of the optical sensor or not. The classification is characterized by an output of the neural network for an input of the neural network and wherein the input is based on the image. The neural network comprises a first convolutional layer that characterizes a 1D-convolution along a vertical axis of a convolution output of a preceding convolutional layer and a second convolutional layer that characterizes a 1D-convolution along a horizontal axis of the convolution output. The output of the neural network is based on a first convolution output of the first convolutional layer and based on a second convolution output of the second convolutional layer.

12 Claims, 7 Drawing Sheets

NEURAL NETWORK FOR CLASSIFYING OBSTRUCTIONS IN AN OPTICAL SENSOR

CROSS REFERENCE

The present application claims the benefit under 35 U.S.C. § 119 of European Patent Application No. EP 21 18 7601.6 filed on Jul. 26, 2021, which is expressly incorporated herein by reference in its entirety.

BACKGROUND INFORMATION

The present invention concerns a neural network configured for classifying whether an optical sensor is obstructed or not, a computer-implemented method for determining whether an optical sensor is obstructed or not, a computer-implemented method for determining a control signal of a robot, a computer program, and a machine-readable storage medium.

SUMMARY

Autonomous devices like robots typically rely on optical sensors for sensing their respective environments. The sensing of the environment is often times a starting point in a processing pipeline with the ultimate goal to derive a suitable action of the autonomous device given its surroundings.

A typical problem that arises in these scenarios is that the optical sensor is obstructed and may thus not accurately capture the environment. In this sense, obstruction may particularly be understood as a situation, in which the sensor is still capable of transmitting correct signals but in which the field of view of the sensor is obstructed to such a degree that no meaningful information about the environment can be deduced from its signals.

It would be desirable to detect whether an optical sensor is obstructed or not. Advantageously, the neural network as provided in accordance with the present invention is able to achieve this goal with a high accuracy. The inventors found that through their careful design of the neural network, its size may be reduced such that it is capable of being executed on even embedded hardware with limited computational power, making the neural network especially appealing for mobile robots or battery-driven devices.

In a first aspect, the present invention concerns a neural network configured for classifying whether an image from an optical sensor characterizes an obstruction of the optical sensor or not, wherein the classification is characterized by an output of the neural network for an input of the neural network and wherein the input is based on the image and wherein the neural network comprises a first convolutional layer that characterizes a 1D-convolution along a height of a convolution output of a preceding convolutional layer and wherein the neural network comprises a second convolutional layer that characterizes a 1D-convolution along a width of the convolution output and wherein the output is based on a first convolution output of the first convolutional layer and the output is based on a second convolution output of the second convolutional layer.

The neural network as referred to in accordance with the present invention can especially be understood as a model from the field of machine learning. Such neural networks may typically be implemented in software. It is, however, also possible to devise hardware such that it characterizes a neural network as defined above.

The neural network comprises convolutional layer and may hence be understood as a convolutional neural network. A convolutional neural network is characterized by the fact that it comprises convolutional layers. A convolutional layer typically accepts a three dimensional tensor as input, wherein a typical convention is that the dimensions characterize height, width, and depth of the tensor in this order. The depth dimension may also be referred to as channels, i.e., characterizing the number of channels that the tensor comprises. In this sense, a three dimensional tensor may be understood as a composition of matrices, which are of the same size and stacked along the depth or channel dimension of the tensor. Images may be understood as tensors, e.g., by encoding them into RGB format and designing each color channel as a channel of a tensor.

A convolutional layer may process a tensor and may output a tensor, i.e., a convolution output. The number of channels in a convolution output is typically given by the number of filters (also known as kernels or filter kernels) employed by the convolutional layer determining the convolution output.

When configured for processing images, neural networks may especially be configured to comprise two dimensional convolutional layers. However, a neural network may also comprise a one dimensional convolutional layer, i.e., a layer characterizing a 1D-convolution. Such a layer may be understood as using filter kernels that span either the entire width of a tensor used as input to the layer or using filter kernels that span the entire height of the tensor. Wherein for two dimensional convolutional layers a filter kernel is typically "slid" along both the width and height of an input tensor, a filter kernel can be understood to only "slide" along one of the two dimensions in one dimensional convolutional layers. If a one dimensional convolutional layer is configured such that its filter kernels span the entire width of a respective input tensor of the one dimensional convolutional layer, the filter kernels are slid along the height of the input tensor to determine a convolution output. Likewise, if a one dimensional convolutional layer is configured such that its filter kernels span the entire height of a respective input tensor of the one dimensional convolutional layer, the filter kernels are slid along the width of the input tensor to determine a convolution output.

The inventors found out, that convolutional layers characterizing 1D-convolutions, i.e., one dimensional convolutional layers, are surprisingly suitable for usage in a neural network, if the neural network is configured for detecting, whether a provided image characterizes an obstruction of an optical sensor that provided the image. Surprisingly, the use of the first convolutional layer and the use of the second convolutional layer improved the accuracy of the neural network. This is due to the fact that the output of the preceding convolutional layer is processed by the first convolutional layer "top to bottom" and "left to right" by the second convolutional layer. The inventors found that obstructions of optical sensor typically manifest themselves in very little change of information in an image of the obstructed optical sensor, either from top to bottom or from left to right. As this information is preserved in the convolutional output of the preceding convolutional layer (i.e., neighboring elements of the output of the preceding convolutional layer characterize neighboring elements of the image), one dimensional convolutional layers are particularly suitable in the neural network.

In the context of the present invention, the term "obstruction" may particularly be understood as a situation, in which the optical sensor is still capable of transmitting correct signals but in which the field of view of the sensor is obstructed to such a degree that no meaningful information about the environment can be deduced from its signals. Obstruction may especially stem from environmental conditions (e.g., glare, strong precipitation, sensor being covered by snow/ice, insufficient light) or intentional actions (e.g., covering up the sensor with a sticker or a foil). An obstructed sensor may also be termed a "blind sensor" or a "blocked sensor".

The optical sensor may especially be given by a camera sensor, a LIDAR sensor, a radar sensor, an ultrasonic sensor, or a thermal camera. As the neural network is configured to process image data from an optical sensor, it may especially be understood as a neural network configured for image analysis.

The neural network may be trained by conventional methods, particularly by means of (stochastic) gradient descent using the backpropagation algorithm or by means of evolutionary algorithms. The labels used in such supervised training methods may especially be provided by a human annotator or conventional automatic labelling methods.

The neural network may output a value characterizing a probability or likelihood of the image to characterize the optical sensor to be obstructed. A classification may be obtained from such a value by applying a predefined threshold. For example, the optical sensor may be classified as obstructed if the probability exceeds 50%.

In a preferred example embodiment of the neural network of the present invention, it is possible that the first convolution output and the second convolution output are used as input to a fully connected layer of the neural network, wherein the output of the neural network is determined based on an output of the fully connected layer.

A typical architectural choice when designing convolutional neural networks is to place the convolutional layers of the convolutional neural network in the front of the neural network and have it followed by a fully connected layer, wherein the fully connected layer is configured to determine the output of the convolutional neural network (for example in residual neural networks configured for image classification). The convolutional layers may, however, also be followed by a plurality of fully connected layers, i.e., a multilayer perceptron or MLP that uses the output of the last convolutional layer as its input (for example, in VGGnets or AlexNets configured for image classification).

In accordance with the present invention, there exist two parallel convolutional layers, namely the first convolutional layer and the second convolutional layer. They are parallel in the sense that they both take input from the same preceding layer and process the respective input individually. Using both of their outputs as input to the fully connected layer hence allows the fully connected layer to draw information about both the "top to bottom" processing of the image as well as the "left to right" processing of the image.

The input of the neural network may be the image itself. However, the inventors found it useful to separate the image into distinct image patches, determine feature representations (also known as feature vectors) for each of such patches and use the resulting feature representations as input of the neural network. In other words, it is also possible that the input of the neural network is a plurality of feature vectors, wherein each feature vector is obtained for a distinct patch of the image. The feature vectors may preferably be organized in a tensor as well, wherein the channel dimension of the tensor characterizes the feature vectors and the feature vectors are located along the height and width of the tensor according to the position in the image of their respective patch for which they are determined. The resulting tensor of feature vectors may then be used as input of a convolutional layer of the neural network.

The features extracted for each image patch may especially comprise feature representations from computer vision, e.g., gradients, HOG features, SIFT features, SURF features, or intensity histograms.

The inventors found that it is advantageous use feature representations as input to the neural network as the neural network does not have to learn about low-level feature representations as is common in the earlier layers of a convolutional neural network. This allows for reducing the number of convolutional layers in the neural network while still maintaining a high accuracy regarding classifying obstructions. This is especially advantageous if the neural network is run on embedded hardware or battery-powered hardware as the smaller neural networks requires less computing power and consumes less energy.

In a preferred embodiment of the neural network of the present invention, it is also possible that the feature vectors from the plurality of feature vectors characterize filtered feature vectors.

This can be understood as running a filtering operation on feature vectors extracted from an image and supplying the filtered feature vectors to the neural network. Filtering of the feature vectors may especially comprise smoothing operations. For example, if the image processed by the neural network is part of a stream of images, e.g., a video signal, an image in the stream has a certain amount of images preceding the image with the exception of a first image in the stream. For filtering, feature vectors may be extracted for patches in the image itself as well as in a predefined amount of preceding images. Feature vectors corresponding to patches at the same locations in the different images may then be processed by a filtering operation. For example, given a patch location, all feature vectors extracted for this patch location from the image as well as the predefined amount of preceding images may be aggregated by means of a median filter, i.e., the element-wise median of the feature vectors for a given patch may be provided as filtered feature vector for the patch. Alternatively, it is also possible to use an average filtering, i.e., provide the element-wise average of the feature vectors for a given patch as the filtered feature vector for the patch. For the first image in the stream, the feature vectors extracted for the patches may be provided as filtered feature vectors.

Filtering the feature vectors is advantageous as it removes high-frequency noise from the feature vectors. For example, if the optical sensor is located behind a wiper for clearing the field of view from rain drops, the filtering operation filters out feature vectors extracted for the wiper. In other words, unwanted temporary blockage that should not be detected as blockage can be effectively filtered out. The inventors found that this improves the accuracy of the neural network even further.

In another aspect, the present invention concerns a computer-implemented method for classifying whether an optical sensor is obstructed or not. In accordance with an example embodiment of the present invention, the method comprises the following steps:

Determining an output from a neural network for a provided input of the neural network, wherein the neural network is configured according to any one of the above-described embodiments, wherein the input is based on an image of the optical sensor;

Determining the classification whether the optical sensor is obstructed or not based on an output of the neural network.

In essence, this aspect relates to a method applying the above-described neural network. In the method, the decision when to classify the optical sensor as obstructed may be chosen individually. For example, it is possible that the optical sensor is classified as obstructed if the output characterizes that the sensor is obstructed and wherein the optical sensor is classified as not obstructed otherwise. In other words, it is possible that the optical sensor is classified as obstructed based on the classification for a single image (or a plurality of images if feature vectors are extracted and filtered).

It is, however, also possible to determine whether the optical sensor is obstructed based on classifications of a plurality of images. It is, for example, possible that for each image of a plurality of images provided from the optical sensor the output of the neural network is determined resulting in a plurality of outputs, wherein further the optical sensor is classified as obstructed if the amount of outputs characterizing the optical sensor to be obstructed is equal to or exceeds a predefined threshold.

For example, if the plurality of images is a stream of images from the optical sensor, the optical sensor may be classified as obstructed if all images from the plurality are classified as obstructed by the neural network. It is, however, also possible that the optical sensor is classified as obstructed if the amount of images classified as obstructed is equal to a predefined threshold or exceeds the predefined threshold.

Preferably, the method for classifying whether the optical sensor is obstructed or not is part of a computer-implemented method for determining a control signal of a robot, wherein the robot senses its environment by means of at least the optical sensor, wherein the control signal is determined based on the classification whether the optical sensor is obstructed or not.

The robot may especially be an at least partially autonomous vehicle, e.g., a car, a drone, water vessel, or a mobile robot. It may alternatively be a manufacturing machine, e.g., configured for welding, soldering, cutting, or mounting.

An action of such a robot, e.g., a movement along a predefined path of the entire robot or parts of it, may be triggered according to a control signal, which may especially be determined based on an environment of the robot. The optical sensor may be configured to perceive the environment of the robot. If the optical sensor is classified as obstructed, suitable actions may be taking such that the robot maintains a safe and desirable operation. For example, control of the robot may be handed over to a human operator thereby at least temporarily terminating the autonomous operation of the robot. Alternatively, it may also be possible to determine the environment without taking into account information from the optical sensor. For example, the robot may be equipped with other optical sensors, e.g., of different type or redundant optical sensors, from which the environment can then be sensed while neglecting information from the optical sensor. The method for classifying whether the optical sensor is obstructed or not may hence serve a method to deduce the appropriate action for the current situation.

Embodiments of the present invention will be discussed with reference to the figures in more detail.

DETAILED DESCRIPTION OF EXAMPLE EMBODIMENTS

Figure 1:
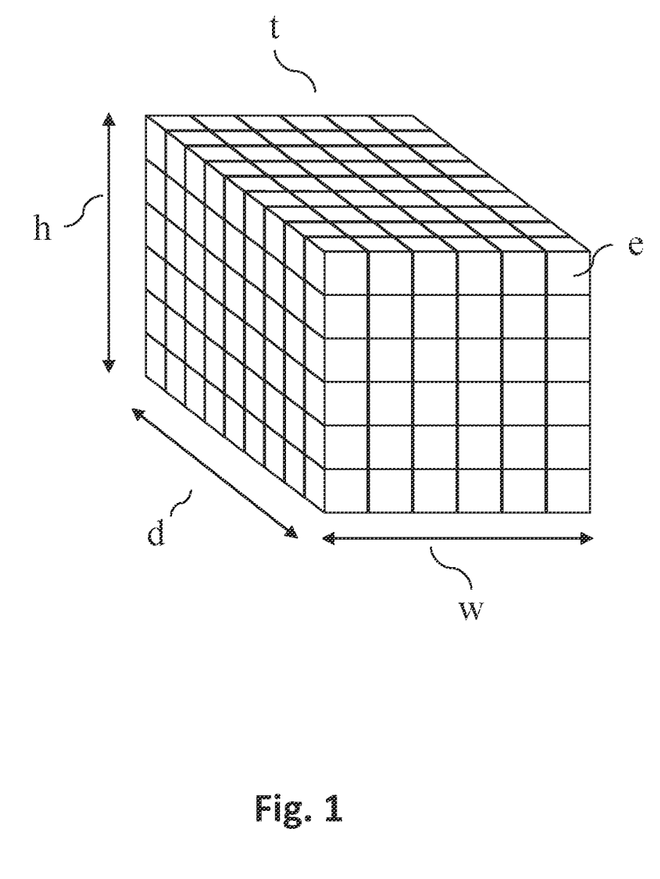
FIG. 1 shows a tensor.

FIG. 1 shows a tensor (t) the tensor is characterized by elements (e), which are organized along a height (h), width (w), and depth (d) of the tensor. The dimension of the tensor (t) corresponding to the height (w) may also be understood as a vertical axis of the tensor (t) while the dimension of the tensor (t) corresponding to the width (w) may be understood as a horizontal axis of the tensor (t). The matrix slices along the depth (d) dimension of the tensor (t) may also be understood as channels of the tensor (t). The tensor (t) may, for example, characterize an image, e.g., an RGB image. In this case, each channel characterizes a color channel of the image and each element (e) characterizes a pixel value of the respective red, green or blue channel. The image may also be given as a gray scale image, in which case the tensor (t) only comprises a single channel and each element (e) characterizes the intensity of a pixel. The tensor (t) may also characterize feature vectors. Each feature vector comprises elements (e) along the depth dimension of the tensor (t). In addition, each feature vector is characterized by a position along the height (h) and width (w) of the tensor.

Figure 2:
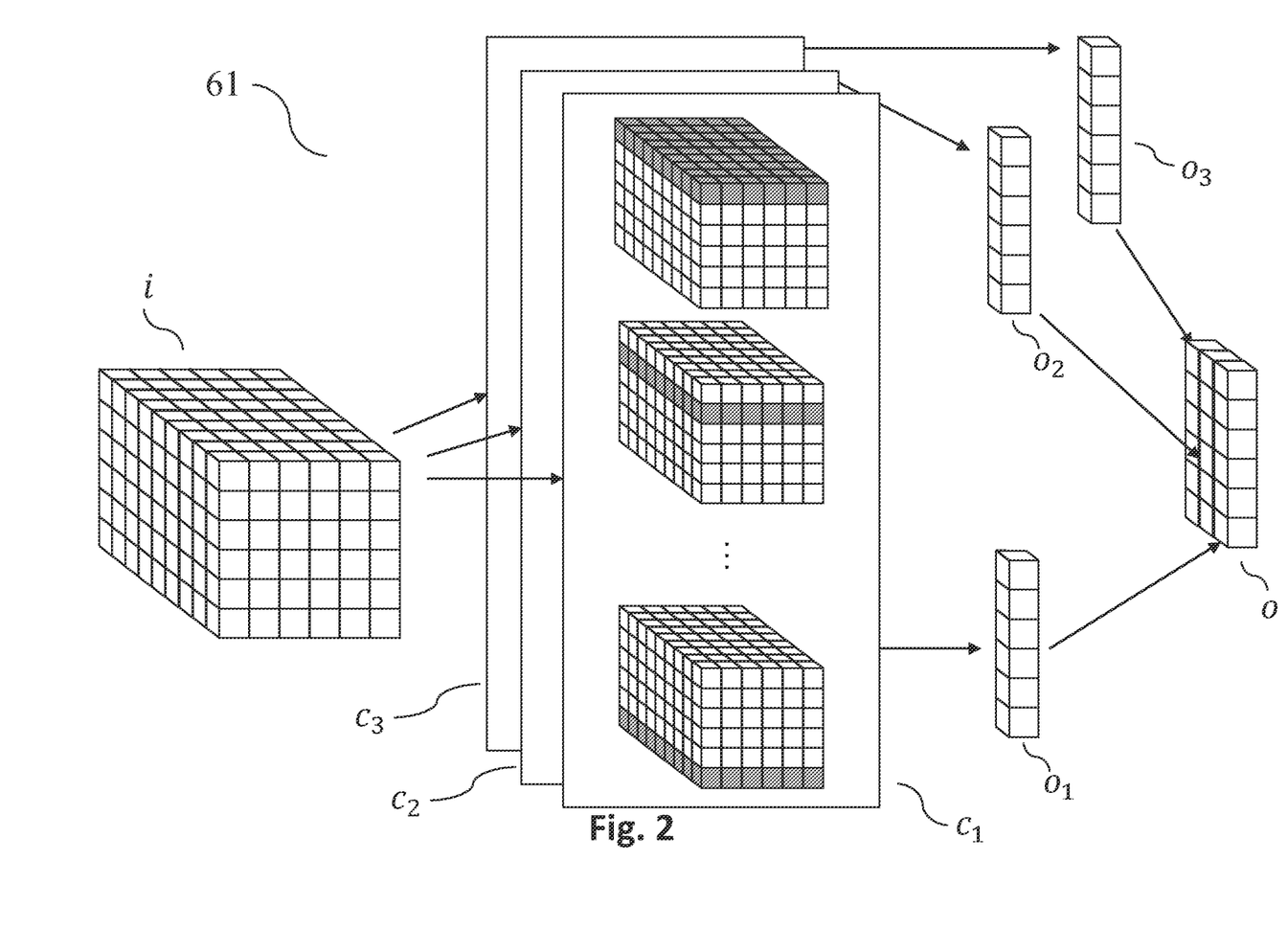
FIG. 2 shows a 1D-convolutional layer.

FIG. 2 schematically shows operations of a 1D-convolutional layer (61). The 1D-convolutional layer accepts an input (i), which is preferably be given in the form of a tensor (t). The input (i) is provided to a first filter ($c_1$) of the 1D-convolutional layer (61). The first filter ($c_1$) comprises a trainable weight for each element (e) in a slice along the depth (d) dimension of the input (i). The first filter ($c_1$) processes the input (i) by performing a discrete convolution of the first filter ($c_1$) with the input (i). FIG. 2 shows an embodiment, in which the first filter ($c_1$) operates along the height (h) dimension of the input (i). In other embodiments (not shown), the first filter ($c_1$) may also operate along the width (w) of the input (i). A first output ($o_1$) if the first filter ($c_1$) may then be provided as output (o) of the 1D-convolutional layer (61). Alternatively, it is also possible that the 1D-convolutional layer (61) comprises a plurality of filters ($c_1$, $c_2$, $c_3$), each comprising a trainable weight for each element (e) in a slice along the depth (d) dimension of the input (i). Each filter of the plurality of filters ($c_1$, $c_2$, $c_3$) may then process the input (i) individually and output a respective output ($o_1$, $o_2$, $o_3$). This way, a plurality of outputs from the filters ($c_1$, $c_2$, $c_3$) may be obtained, which in turn may be concatenated along a predefined dimension in order to determine the output (o) of the 1D-convolutional layer (62).

Figure 3:
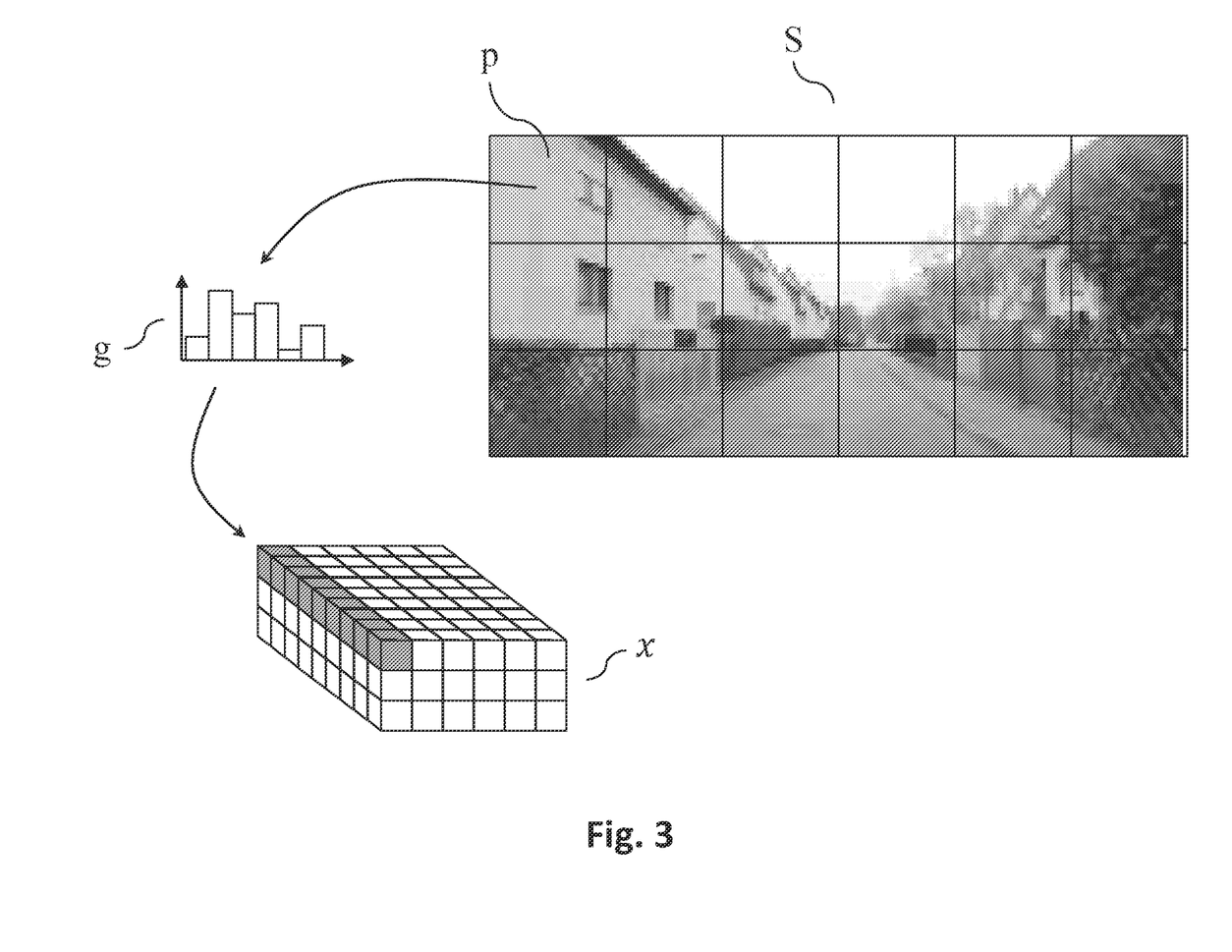
FIG. 3 shows a method for extracting an input from an image.

FIG. 3 shows a preferred method concerning how to extract feature vectors from an image (S) and aggregating the extracted feature vectors into a tensor (x) that may be used as input for a neural network. The image (S) is split into disjoint patches (p). For each image, a feature vector is extracted. The feature vector may, for example, be a histogram of oriented gradients (g). The histogram may then be cast into a vector, which is used as feature vector of the tensor (x).

Figure 4:
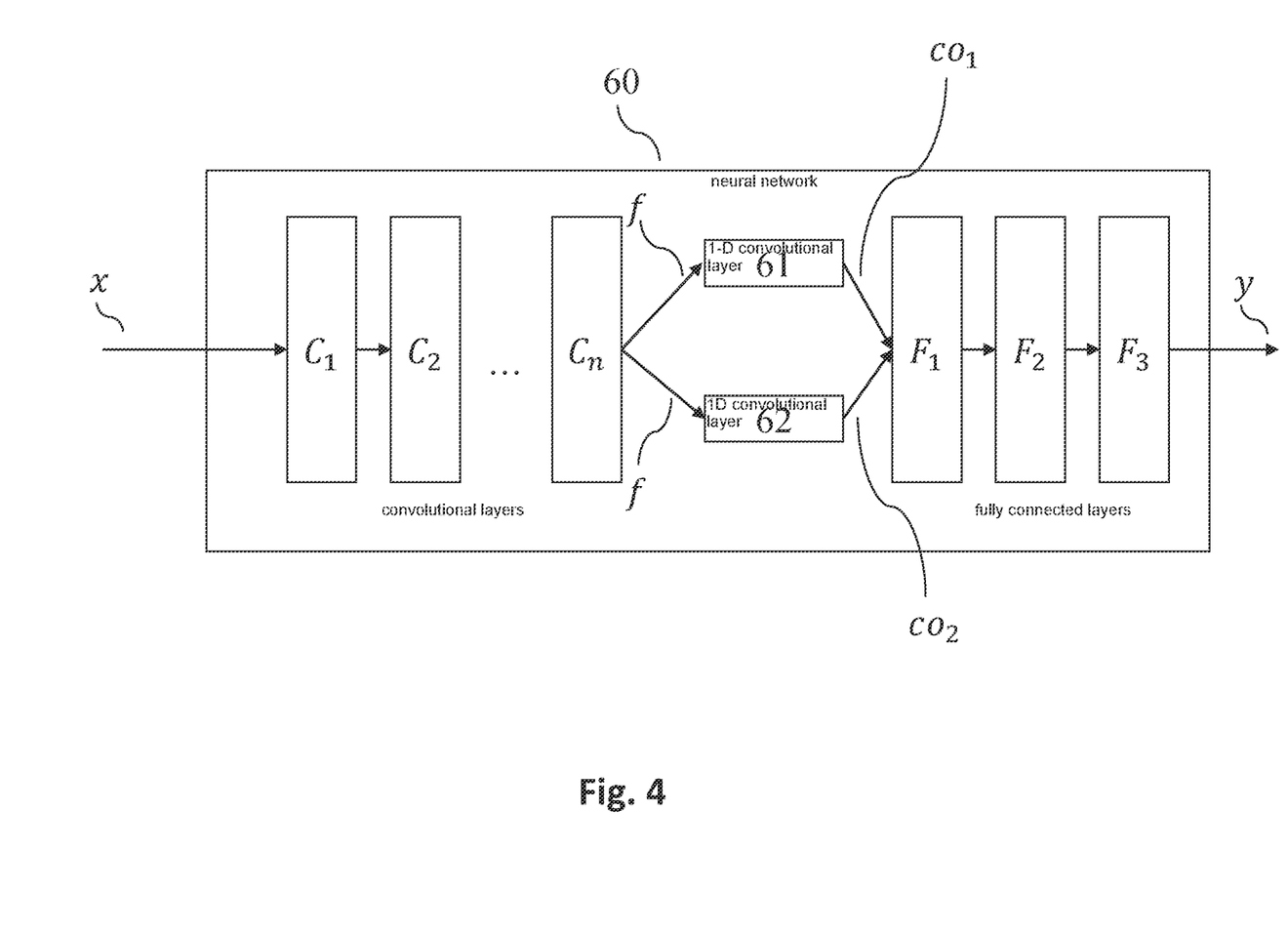
FIG. 4 shows a neural network comprising the 1D-convolutional layer.

FIG. 4 shows a neural network (60) comprising two 1D-convolutional layers (61, 62). The neural network (60) comprises a plurality of convolutional layers ($C_1$, $C_2$, $C_n$), wherein the plurality of convolutional layers ($C_1$, $C_2$, $C\_n$) may be configured to accept an input signal (x) as input and provide a tensor (t) characterizing a feature representation (f) of the input signal (x). The feature representation (f) is then provided to a first 1D-convolutional layer (61) and a second 1D-convolutional layer (62). The first 1D-convolutional layer (61) is configured to operate along the height (h) dimension of the feature representation (f) while the second 1D-convolutional layer is configured to operate along the width (w) dimension of the feature representation (f). By virtue of being obtained from a convolutional layer, the feature representation (f) may also be understood as convolution output. The first 1D-convolutional layer (61) and the second 1D-convolutional layer (62) determine a first convolution output ($co_1$) and a second convolution output respectively ($co_2$). The first convolutional output ($co_1$) and the second convolutional output ($co_2$) may especially each be a matrix. The first convolution output ($co_1$) and the second convolution output ($co_2$) may then be provided as input to a fully connected layer ($F_1$) of the neural network (60). In order to be used as input, the first convolution output ($co_1$) and the second convolution output ($co_2$) may each be flattened to a vector and the resulting vectors may then be concatenated to form a larger vector that is used as input to the fully connected layer ($F_1$). The fully connected layer ($F_1$) may especially be part of a plurality of fully connected layers ($F_1$, $F_2$, $F_3$), i.e., be part of a multilayer perceptron that is part of the neural network (60). An output of the multilayer perceptron may then be provided as output signal (y), i.e., as output of the neural network (60). If the fully connected layer ($F_1$) is used for providing an output of the neural network (60), the output of the fully connected layer ($F_1$) may be provided as output signal (y.)

In further embodiments, it is also possible that the input signal (x) comprises feature vectors, wherein each feature vector characterizes a patch of an image. A patch of the image may be understood as a plurality of pixels of the image, wherein each patch characterizes a rectangular region of the image and the image can be split into disjoint patches. The feature vectors may especially characterize SIFT, SURF, SWIFT or other gradient features of the patches of the image.

The neural network (60) may especially be trained to determine based on the input signal (x) whether an optical sensor from which the input signal (x) was determined is obstructed or not. The output signal (y) may especially characterize a probability value characterizing the probability of the optical sensor being obstructed. Additionally or alternatively, the output signal (y) may also characterize the probability of the optical sensor to not be obstructed.

The neural network (60) may especially be trained in a supervised fashion, preferably by means of a (potentially stochastic) gradient descent algorithm or an evolutionary algorithm. For training, the neural network (60) may be provided a training input signal and a desired output signal characterizing whether the training input signal characterizes an obstructed optical sensor or not.

Figure 5:
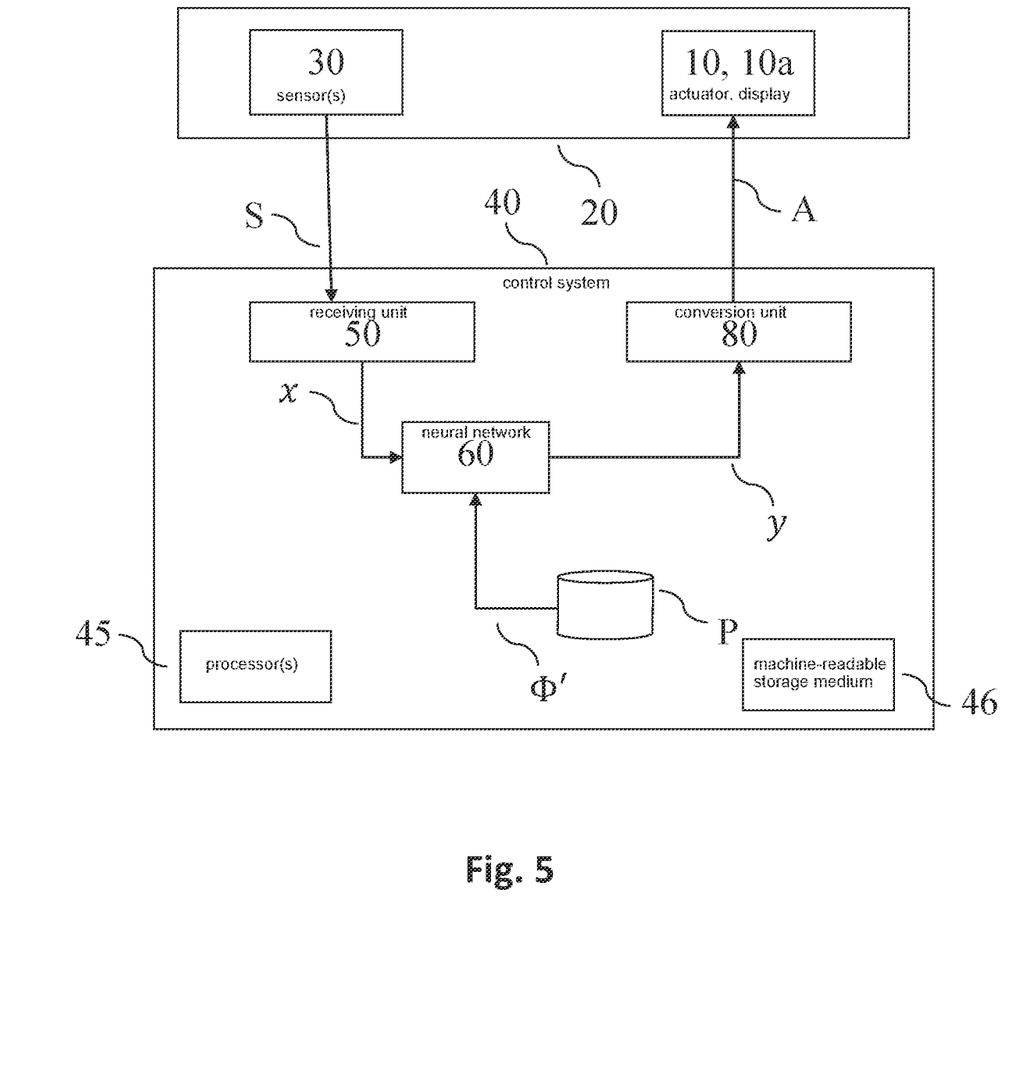
FIG. 5 shows a control system comprising the neural network for controlling an actuator in its environment.

FIG. 5 shows an embodiment of an actuator (10) in its environment (20). The actuator (10) interacts with a control system (40). The actuator (10) and its environment (20) will be jointly called actuator system. At preferably evenly spaced points in time, an optical sensor (30) senses a condition of the actuator system. The optical sensor (30) may comprise several sensors. An output signal (S) of optical the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x), e.g., by extracting feature vectors for patches of the sensor signals (S). The input signal (x) may also characterize feature vectors that have been filtered. For example the receiving unit (50) may save feature vectors for other sensor signals preceding the sensor signal (S) and may then determine median feature vectors or average feature vectors for the sensor signals and the other sensor signal (S). In other words, the input signal (x) is provided in accordance with the sensor signal (S).

The input signal (x) is then passed on to the neural network (60).

The neural network (60) is parametrized by parameters ($\Phi$), which are stored in and provided by a parameter storage ($St_1$).

The neural network (60) determines an output signal (y) from the input signals (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the invention.

Figure 6:
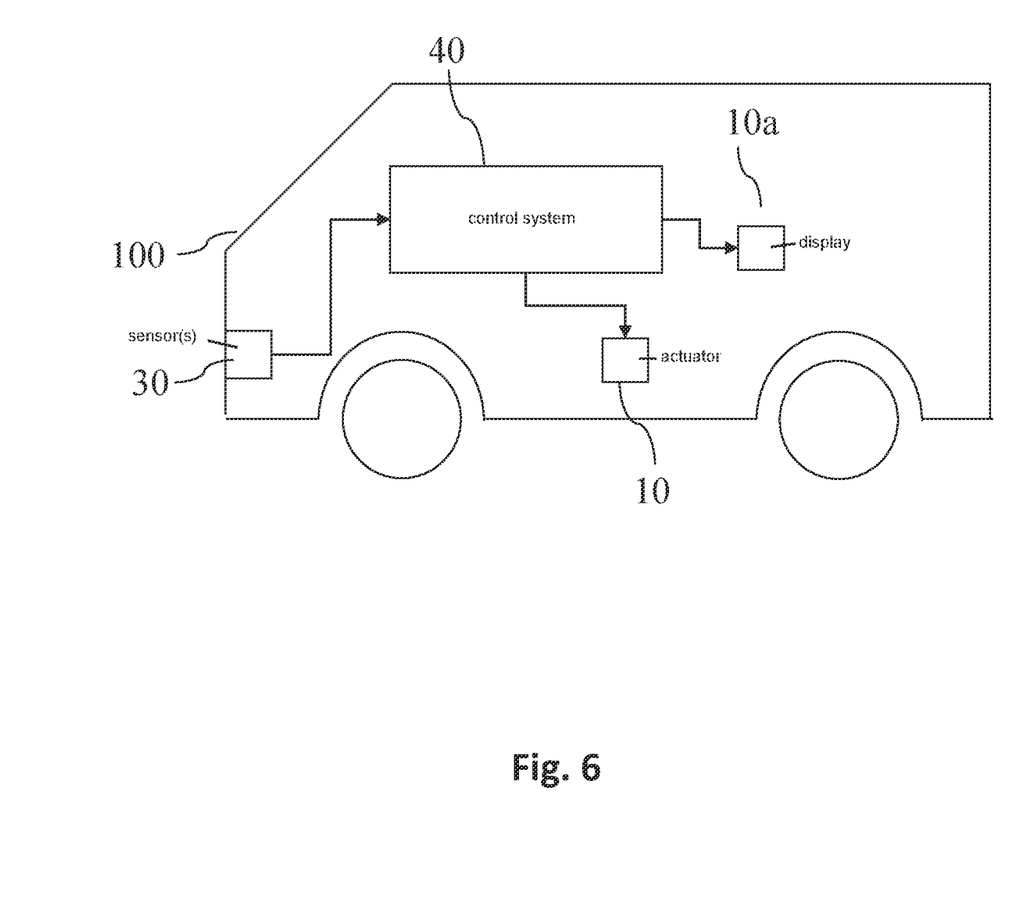
FIG. 6 shows the control system controlling an at least partially autonomous robot.

FIG. 6 shows an embodiment in which the control system (40) is used to control an at least partially autonomous robot, e.g., an at least partially autonomous vehicle (100).

The optical sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The neural network (60) may be configured to detect obstructions of an optical sensor (30) of the vehicle (100). The control signal (A) may then be chosen in accordance with the output signal (y) determined from the neural network (60). For example, if the optical sensor (30) is obstructed, a detection of the environment (20) of the vehicle (100) may be obtained without considering information from the obstructed optical sensor (30). For example, the vehicle (100) may be equipped with a camera sensor and a LIDAR sensor, which are both used for detecting objects in the vicinity of the vehicle (100). The neural network (60) may be configured to determine if the camera sensor is obstructed or not. If it is classified as obstructed, objects detected based on images of the camera sensor or a detection of no objects based on images of the camera sensor may be ignored for determining routes of the vehicle (100) and/or navigating the vehicle (100).

Alternatively, for example when using only a camera sensor for determining the environment (20) of the vehicle (100), it is also possible to hand over operation of the vehicle (100) to a human driver or operator in case it is determined that an optical sensor (30) of the vehicle (100) is obstructed.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with objects in the vicinity of the vehicle (100).

Alternatively or additionally, the control signal (A) may also be used to control the display (10a), e.g., for displaying to a driver or operator of the vehicle (100) that the optical sensor (30) is obstructed. It can also be imagined that the control signal (A) may control the display (10a) such that it produces a warning signal, if the optical sensor (30) is classified to be obstructed. The warning signal may be a warning sound and/or a haptic signal, e.g., a vibration of a steering wheel of the vehicle (100).

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the optical sensor (30) to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The optical sensor (30) may detect a state of an object which is to undergo processing by the household appliance. For example, in the case of the domestic appliance being a washing machine, the optical sensor (30) may detect a state of the laundry inside the washing machine. The control signal (A) may then be determined depending on a detected material of the laundry.

Figure 7:
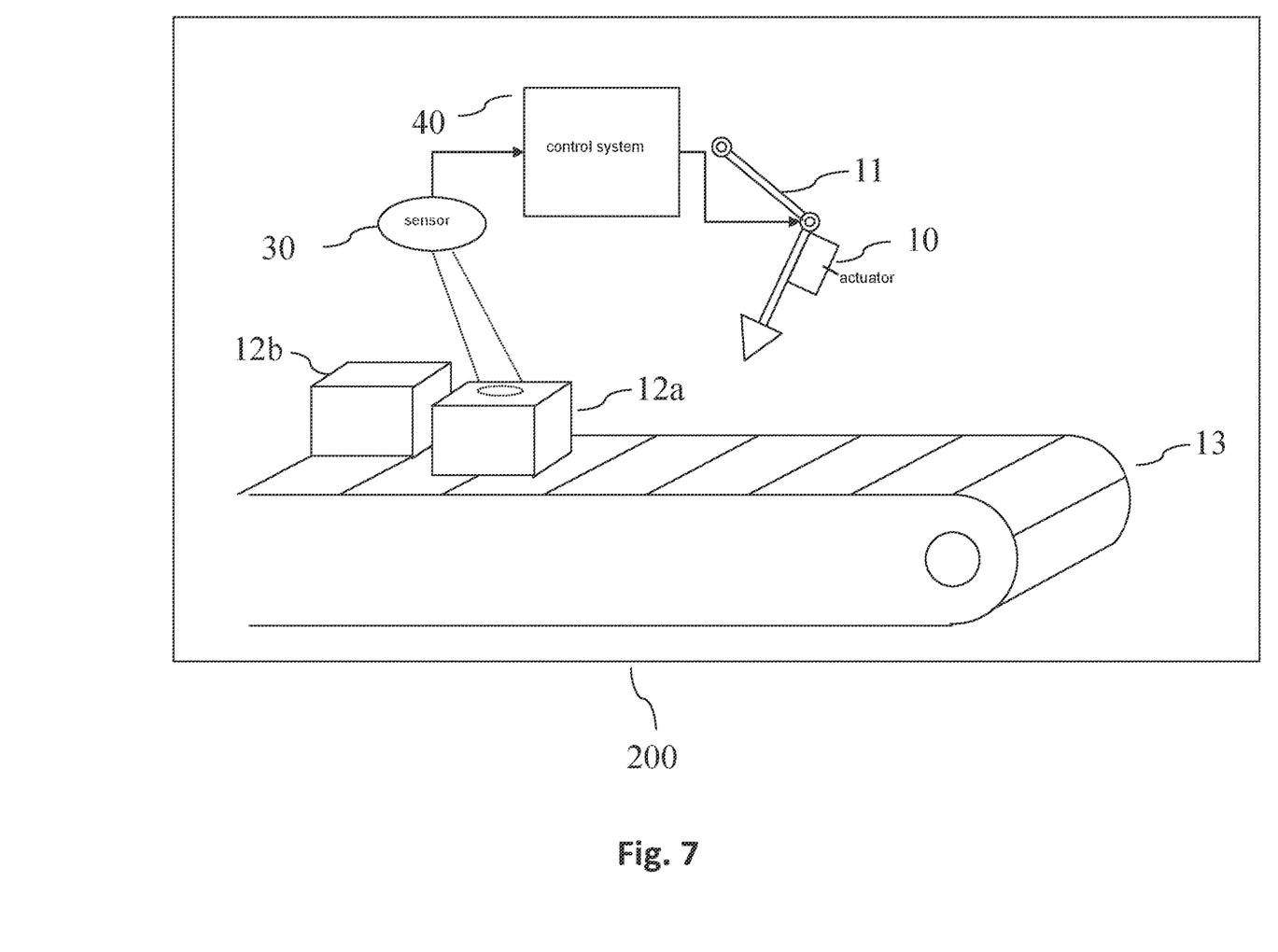
FIG. 7 shows the control system controlling a manufacturing machine.

FIG. 7 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The optical sensor (30) may capture properties of, e.g., a manufactured product (12). The actuator (10) may be controlled depending on a position detected by, e.g., a second neural network. For example, the actuator (10) may be controlled to cut the manufactured product at a specific location of the manufactured product itself. Alternatively, it may be envisioned that the second neural network classifies, whether the manufactured product is broken or exhibits a defect. The actuator (10) may then be controlled as to remove the manufactured product from the transportation device.

The neural network (60) may be configured to whether the optical sensor (30) is obstructed or not. If the optical sensor (30) is classified as obstructed, the manufacturing machine (11) may be stopped and/or an operator or technician may be alerted to conduct maintenance on the manufacturing machine (11).

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A system, comprising:
 a processor; and
 a non-transitory machine-readable storage medium on which is stored a program that, when executed by the processor, causes the processor to implement:
   a neural network configured for classifying whether an image from an optical sensor characterizes an obstruction of the optical sensor or not, the classification being characterized by an output of the neural network for an input of the neural network, and the input is based on the image, the neural network comprising:
     a first convolutional layer that characterizes a 1D-convolution along a vertical axis of a convolution output of a preceding convolutional layer; and
     a second convolutional layer that characterizes a 1D-convolution along a horizontal axis of the convolution output;
   wherein the output of the neural network is based on a first convolution output of the first convolutional layer and is based on a second convolution output of the second convolutional layer.

2. The system according to claim 1, wherein the first convolution output and the second convolution output are used as input to a fully connected layer of the neural network, wherein the output of the neural network is determined based on an output of the fully connected layer.

3. The system according to claim 1, wherein the input of the neural network is the image.

4. The system according to claim 1, wherein the input of the neural network is a plurality of feature vectors, wherein each of the feature vectors is obtained for a distinct patch of the image.

5. The system according to claim 4, wherein the feature vectors from the plurality of feature vectors characterize filtered feature vectors.

6. A computer-implemented method for classifying whether an optical sensor is obstructed or not, comprising the following steps:
- determining an output from a neural network for a provided input of the neural network, wherein the input is based on an image of the optical sensor, the neural network including:
  - a first convolutional layer that characterizes a 1D-convolution along a vertical axis of a convolution output of a preceding convolutional layer, and
  - a second convolutional layer that characterizes a 1D-convolution along a horizontal axis of the convolution output,
  - wherein the output of the neural network is based on a first convolution output of the first convolutional layer and is based on a second convolution output of the second convolutional layer;
- determining the classification whether the optical sensor is obstructed or not based on the output of the neural network.

7. The method according to claim 6, wherein the optical sensor is classified as obstructed when the output characterizes that the optical sensor is obstructed and wherein the optical sensor is classified as not obstructed otherwise.

8. The method according to claim 6, wherein for each image of a plurality of images provided from the optical sensor, the output of the neural network is determined resulting in a plurality of outputs, the optical sensor is classified as obstructed when the amount of outputs characterizing the optical sensor to be obstructed is equal to or exceeds a predefined threshold and wherein the optical sensor is classified as not obstructed otherwise.

9. A computer-implemented method for determining a control signal of a robot, the method comprising:
- sensing, by the robot, its environment using at least one optical sensor;
- determining the control signal based on a classification of whether the optical sensor is obstructed or not;
- where the classification is obtained by
  - determining an output from a neural network for a provided input of the neural network, wherein the input is based on an image of the optical sensor, the neural network including:
    - a first convolutional layer that characterizes a 1D-convolution along a vertical axis of a convolution output of a preceding convolutional layer, and
    - a second convolutional layer that characterizes a 1D-convolution along a horizontal axis of the convolution output,
    - wherein the output of the neural network is based on a first convolution output of the first convolutional layer and is based on a second convolution output of the second convolutional layer;
  - determining the classification whether the optical sensor is obstructed or not based on the output of the neural network.

10. The method according to claim 9, wherein the robot is an at least partially autonomous vehicle or a manufacturing robot.

11. The method according to claim 6, wherein the optical sensor includes a camera sensor and/or a LIDAR sensor and/or a radar sensor and/or an ultrasonic sensor and/or a thermal camera.

12. A non-transitory machine-readable storage medium on which is stored a computer program for classifying whether an optical sensor is obstructed or not, the computer program, when executed by a processor, causing the processor to perform the following steps:
- determining an output from a neural network for a provided input of the neural network, wherein the input is based on an image of the optical sensor, the neural network including:
  - a first convolutional layer that characterizes a 1D-convolution along a vertical axis of a convolution output of a preceding convolutional layer, and
  - a second convolutional layer that characterizes a 1D-convolution along a horizontal axis of the convolution output,
  - wherein the output of the neural network is based on a first convolution output of the first convolutional layer and is based on a second convolution output of the second convolutional layer;
- determining the classification whether the optical sensor is obstructed or not based on the output of the neural network.

* * * * *